(12) United States Patent
Satake (10) Patent No.: US 11,496,052 B2
(45) Date of Patent: Nov. 8, 2022

(54) INSULATED POWER SUPPLY CIRCUIT

(71) Applicant: Mitsubishi Electric Engineering Company, Limited, Chiyoda-ku (JP)

(72) Inventor: Takanori Satake, Chiyoda-ku (JP)

(73) Assignee: Mitsubishi Electric Engineering Company, Limited, Chiyoda-ku (JP)

( * ) Notice: Subject to any disclaimer, the term of this patent is extended or adjusted under 35 U.S.C. 154(b) by 80 days.

(21) Appl. No.: 16/980,682

(22) PCT Filed: Apr. 19, 2018

(86) PCT No.: PCT/JP2018/016202
§ 371 (c)(1),
(2) Date: Sep. 14, 2020

(87) PCT Pub. No.: WO2019/202714
PCT Pub. Date: Oct. 24, 2019

(65) Prior Publication Data
US 2021/0021196 A1  Jan. 21, 2021

(51) Int. Cl.
*H02M 3/335* (2006.01)
*G06F 7/575* (2006.01)
*H02M 1/08* (2006.01)

(52) U.S. Cl.
CPC ............ *H02M 3/335* (2013.01); *G06F 7/575* (2013.01); *H02M 1/08* (2013.01)

(58) Field of Classification Search
CPC .......... H02M 3/335; H02M 1/08; G06F 7/575
USPC ....................................................... 363/21.01
See application file for complete search history.

(56) References Cited

U.S. PATENT DOCUMENTS

| | | | |
|---|---|---|---|
| 4,862,339 A * | 8/1989 | Inou ................... | H02M 3/33553 363/80 |
| 6,154,374 A | 11/2000 | Uejima et al. | |
| 2016/0006344 A1* | 1/2016 | Hayashi ................ | H02M 1/08 307/31 |

FOREIGN PATENT DOCUMENTS

| | | |
|---|---|---|
| JP | 2003-169467 A | 6/2003 |
| JP | 3461730 B2 | 10/2003 |

OTHER PUBLICATIONS

International Search Report dated Jun. 12, 2018 in PCT/JP2018/016202 filed on Apr. 19, 2018, 1 page.

* cited by examiner

*Primary Examiner* — Yemane Mehari
(74) *Attorney, Agent, or Firm* — Oblon, McClelland, Maier & Neustadt, L.L.P.

(57) ABSTRACT

An insulated power supply circuit includes a power input circuit including a switching control circuit and a switching element connected to a corresponding winding of a transformer, and power output circuits of two systems each including a regulator connected to a corresponding winding. By the control circuit controlling ON/OFF of the switching element in accordance with an output condition change command signal, which is generated based on a load condition at an output destination of each regulator, a voltage corresponding to an estimated value of a preset excitation level is generated, to thereby change the excitation level of the winding. Each regulator receives an output voltage generated in a corresponding winding in response to the change in excitation level.

19 Claims, 7 Drawing Sheets

INSULATED POWER SUPPLY CIRCUIT

TECHNICAL FIELD

The present invention relates to an insulated power supply circuit capable of changing an output voltage of each of a plurality of secondary-side windings provided on a secondary side of an insulation transformer, in accordance with a load to be connected to each of the secondary-side windings.

BACKGROUND ART

In recent years, digital circuits represented by a microcomputer have been required to, for example, enable multiple systems with low voltage and save power consumption. Further, factory automation (FA) devices have been required to ensure insulation of an analog input/output circuit and a digital input/output circuit, which are incorporated in the FA device, and insulation of an external interface.

As one well-known art for generating output power of a plurality of insulated systems, the following configuration has been known. That is, a plurality of windings are provided on a secondary side of an insulation transformer in an insulated power supply circuit, and feedback control is performed with the use of one of the windings. In addition, a regulator is provided to another secondary-side winding uninvolved in feedback control.

To give an example of the configuration, there is a power supply device (see, for example, Patent Literature 1) in which a main output circuit and a sub-output circuit are provided to two windings provided on a secondary side of a switching transformer, with respect to a large-power LED and a small-power LED being loads. The main output circuit includes a state transition unit, and the sub-output circuit includes an opening/closing unit. The LED is a so-called light emitting diode. Incidentally, the above-mentioned regulator, main output circuit, and sub-output circuit can be regarded as power output circuits.

In such a power supply device, an open/close state of the opening/closing unit is switchingly controlled in accordance with a switching control signal, and also feedback control is performed with the use of an output of the main output circuit or the sub-output circuit. With this operation, a voltage to be applied to the large-power LED is switched between two states: high level and low level. Incidentally, the high level is equal to or more than a forward voltage Vf, and the low level is less than the forward voltage Vf.

CITATION LIST

Patent Literature

[PTL 1] W 2014-217135 A

SUMMARY OF INVENTION

Technical Problem

In the above-mentioned power supply device of Patent Literature 1, an output voltage of the secondary-side winding of the switching transformer, which is uninvolved in feedback control, is varied depending on a state of a load connected to each of the secondary-side windings. For example, feedback control is performed with the use of one of two secondary-side windings, and a heavier load is connected to the one secondary-side winding. In this case, an output voltage of another secondary-side winding uninvolved in feedback control is increased.

In general, in order to stabilize an output of a regulator as an example of a constant-voltage power supply circuit connected to a secondary-side winding of an insulation transformer in an insulated power supply circuit, it is required to ensure a potential difference equal to or more than a prescribed value between an input voltage and an output voltage of the regulator. For example, when a switching regulator as one kind of regulator is adopted, it is required to ensure a potential difference for operation in a maximum duty cycle or a minimum duty cycle. When a series regulator is adopted, a voltage cannot be boosted. Thus, it is required to set, as an input voltage, a voltage obtained by adding a voltage equal to or more than a potential difference of the series regulator to an output voltage of the series regulator. Under any load condition, in order to satisfy those requirements, it is required to previously increase by a potential difference an output voltage of the secondary-side winding of the insulation transformer in the insulated power supply circuit.

In short, regarding an input voltage of a regulator connected to a secondary-side winding uninvolved in feedback control, it is required to ensure a potential difference against the maximum load connected to the regulator even when a secondary-side winding involved in feedback control is in a low-load state. This means that a larger amount of current is consumed in one or more devices connected to the secondary-side winding involved in feedback control, and an output voltage is increased in the secondary-side winding uninvolved in feedback control. In addition, when the secondary-side winding involved in feedback control is in the low-load state, a potential difference of the regulator is increased. This results in a problem in that a regulator uninvolved in feedback control is reduced in efficiency, and excessive heat is generated.

The power supply device of Patent Literature 1 includes a shunt regulator connected to the sub-output circuit, and thus has a function of switching between the main output circuit and the sub-output circuit. However, in the power supply device of Patent Literature 1, even when the main output circuit is switched to the sub-output circuit, the main output circuit is not shut off. Thus, in order to ensure this device to operate without any failure, it is required to set an ON voltage of an LED light connected to the main output circuit and an ON voltage of an LED auxiliary light connected to the sub-output circuit to have a difference that is several times as high as the forward voltage Vf. In this case, there arises a problem in that normal operation is not achieved when the LED light and the LED auxiliary light have a difference from the forward voltage Vf, which is as small as about several V.

The present invention has been made to solve the above-mentioned problems, and therefore has an object to provide an insulated power supply circuit, which allows reduction of a potential difference between an output voltage of each secondary-side winding, which is generated depending on a load to be connected to a secondary side of an insulation transformer, and an optimum input voltage of a power output circuit provided to each secondary-side winding, and is thus capable of ensuring high efficiency and low heat generation.

Solution to Problem

According to one embodiment of the present invention, there is provided an insulated power supply circuit including: an insulation transformer including a primary-side winding provided on a primary side thereof, and secondary-side windings provided on a secondary side thereof; a power input circuit, which is connected to the primary-side winding, and is configured to receive power supply to excite the primary-side winding through ON/OFF of a switching function; and power output circuits, each of which is connected to a corresponding one of the secondary-side windings, and is configured to, along with excitation of the primary-side winding, receive as an input voltage an output voltage generated in the corresponding one of the secondary-side windings, to thereby apply a constant voltage to a corresponding load. In this configuration, the power input circuit has a voltage generation function of generating a voltage corresponding to an estimated value of a preset excitation level by controlling the ON/OFF of the switching function based on an output condition change command signal, which is generated in accordance with a load condition as a command to change the output voltage. The power input circuit is configured to change an excitation level of the primary-side winding based on the voltage obtained with use of the voltage generation function. Each of the power output circuits is configured to receive as the input voltage the output voltage generated in the corresponding one of the secondary-side windings in response to the change in excitation level, to thereby apply the voltage to the corresponding load.

Advantageous Effects of Invention

According to the present invention, with the above-mentioned configuration, it is possible to reduce the potential difference between the output voltage of each secondary-side winding, which is generated depending on the load to be connected to the secondary side of the insulation transformer, and the optimum input voltage of the power output circuit provided to each secondary-side winding, and thus high efficiency and low heat generation can be ensured.

DESCRIPTION OF EMBODIMENTS

Now, insulated power supply circuits according to some embodiments of the present invention are described in detail with reference to the drawings.

Figure 6:
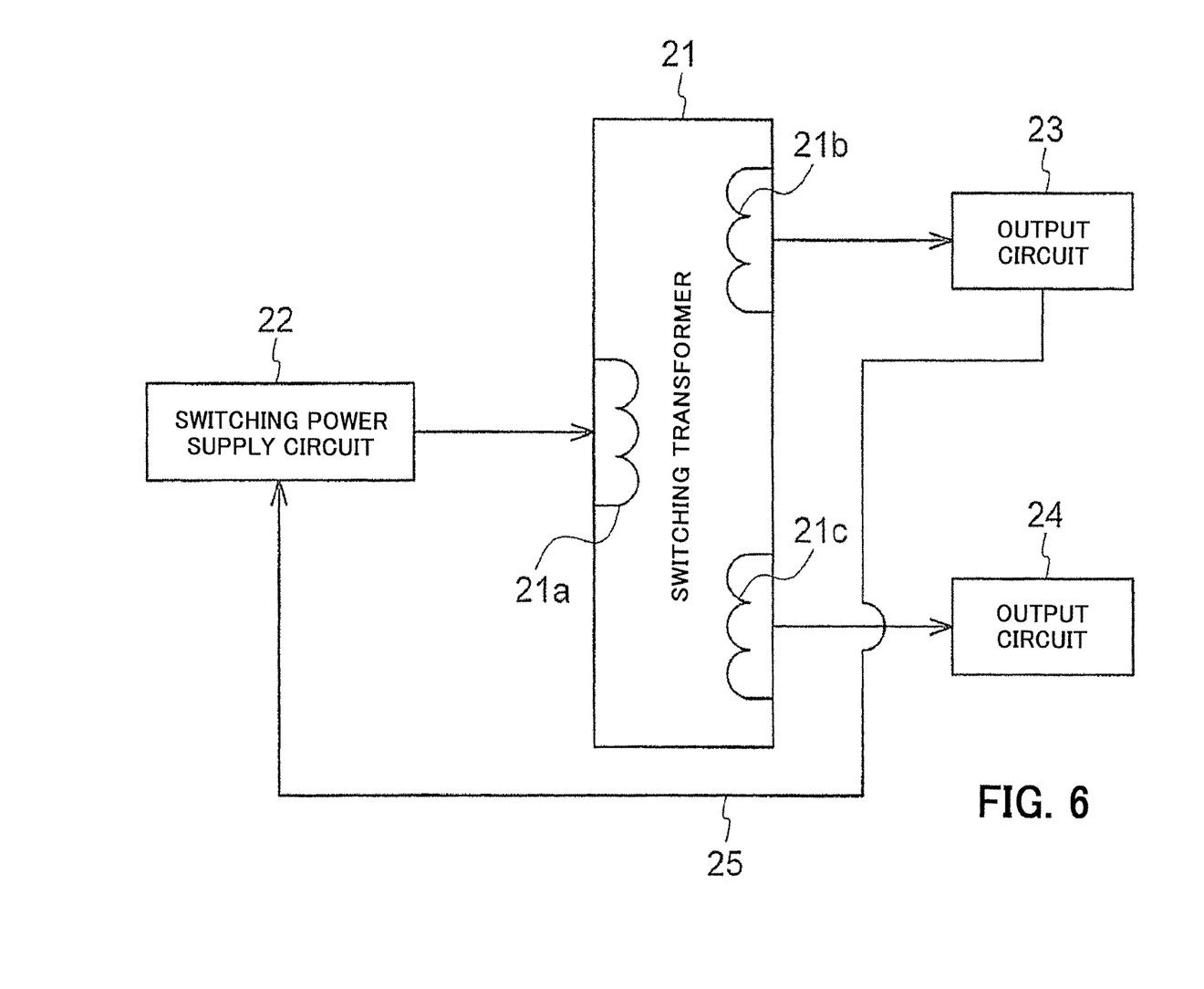
FIG. 6 is a simplified circuit diagram for illustrating a basic configuration of an insulated power supply circuit of one example of the well-known art.

First of all, for easy understanding of the present invention, a description is specifically given of problems in an insulated power supply circuit of the well-known art, and technical overview of solutions to those problems. FIG. 6 is a simplified circuit diagram for illustrating a basic configuration of an insulated power supply circuit of one example of the well-known art.

With reference to FIG. 6, in this insulated power supply circuit, one primary-side winding 21a is provided on a primary side of a switching transformer 21, and one pair of secondary-side windings 21b and 21c are provided on a secondary side thereof. The primary-side winding 21a is connected to a switching power supply circuit 22. The one pair of secondary-side windings 21b and 21c are connected to output circuits 23 and 24, respectively. The output circuit 23 is used for feedback control, and is configured to output a feedback signal 25 to the switching power supply circuit 22.

With this insulated power supply circuit, when a heavier load is connected to the output circuit 23 connected to the secondary-side winding 21b involved in feedback control, an output voltage is increased in the output circuit 24 connected to the secondary-side winding 21c uninvolved in feedback control. In order to stabilize an output voltage of the output circuit 24, it is required to ensure a potential difference equal to or more than a prescribed value between the input voltage and the output voltage of the output circuit 24.

However, regarding the input voltage of the output circuit 24, it is required to ensure a potential difference against the maximum load connected to the output circuit 24 even when the output circuit 23 is in a low-load state. This means that a larger amount of current is consumed in each device of the output circuit 23, and an output voltage of the output circuit 24 is increased. In addition, when the output circuit 23 is in the low-load state, a potential difference of the output circuit 24 is increased. As a result, the output circuit 24 is reduced in efficiency, and excessive heat is generated.

In view of the foregoing, an object of the present invention is to provide an insulated power supply circuit, which allows reduction of a potential difference between an output voltage of each secondary-side winding, which is generated depending on a load connected to a secondary side of an insulation transformer, and an optimum input voltage of a power output circuit provided to each secondary-side winding, and is thus capable of ensuring high efficiency and low heat generation.

In order to achieve the above-mentioned object, the insulated power supply circuit includes, in its configuration, an insulation transformer including a primary-side winding provided on a primary side thereof, and secondary-side windings provided on a secondary side thereof. The insulated power supply circuit further includes a switching-type power input circuit connected to the primary-side winding and configured to receive power supply to excite the primary-side winding through ON/OFF of a switching function. Regarding the power supply to the power input circuit, a DC power supply may supply power, or AC power may be converted into DC power and then supplied. The insulated power supply circuit further includes a power output circuit connected to a corresponding secondary-side winding and configured to receive as an input voltage an output voltage generated in the corresponding secondary-side winding along with the excitation of the primary-side winding, to thereby apply a constant voltage to a load. The power output circuit encompasses a connection circuit configuration including a constant-voltage power supply circuit connected to the secondary-side winding and its subsequent circuits. The same applies to the following description.

In the insulated power supply circuit having the above-mentioned configuration, the power input circuit adopts an output condition change command signal. The command signal is generated in accordance with a load condition of a load. In addition, the command signal is a command to change an output condition for changing an output voltage. With this signal, the power input circuit achieves a voltage generation function of generating a voltage corresponding to an estimated value of a preset excitation level by controlling the ON/OFF of the switching function. The excitation level of the primary-side winding is changed based on the voltage obtained with the use of the above-mentioned voltage generation function. The power output circuit receives, as an input voltage, an output voltage generated in the secondary-side winding in response to the change in excitation level. Consequently, the above-mentioned object is achieved, and the insulated power supply circuit that ensures high efficiency and low heat generation is obtained. A description is given in detail below of some exemplary embodiments of the insulated power supply circuit according to the present invention.

First Embodiment

Figure 1:
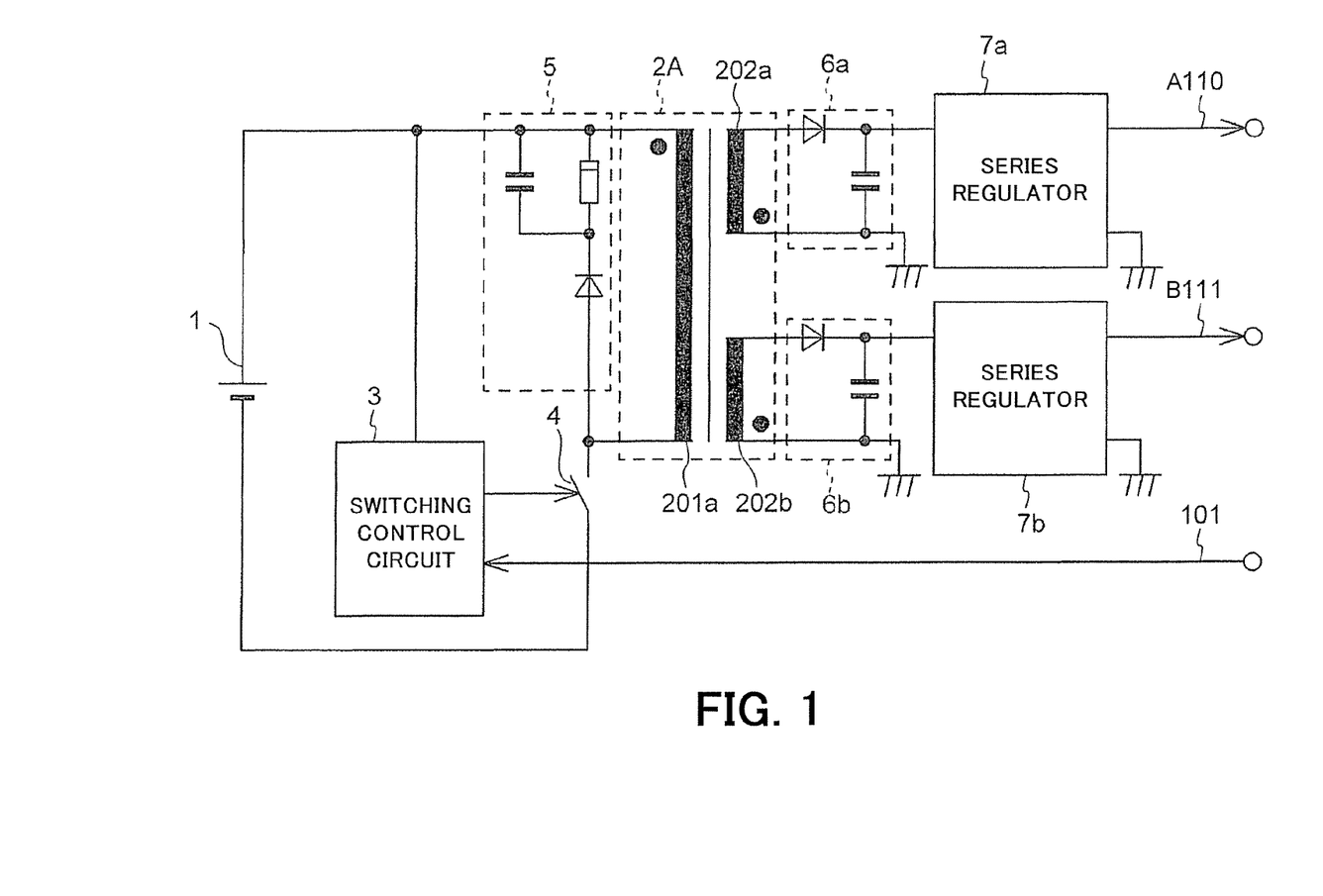
FIG. 1 is a schematic circuit diagram for illustrating a basic configuration of an insulated power supply circuit according to a first embodiment of the present invention.
Figure 7:
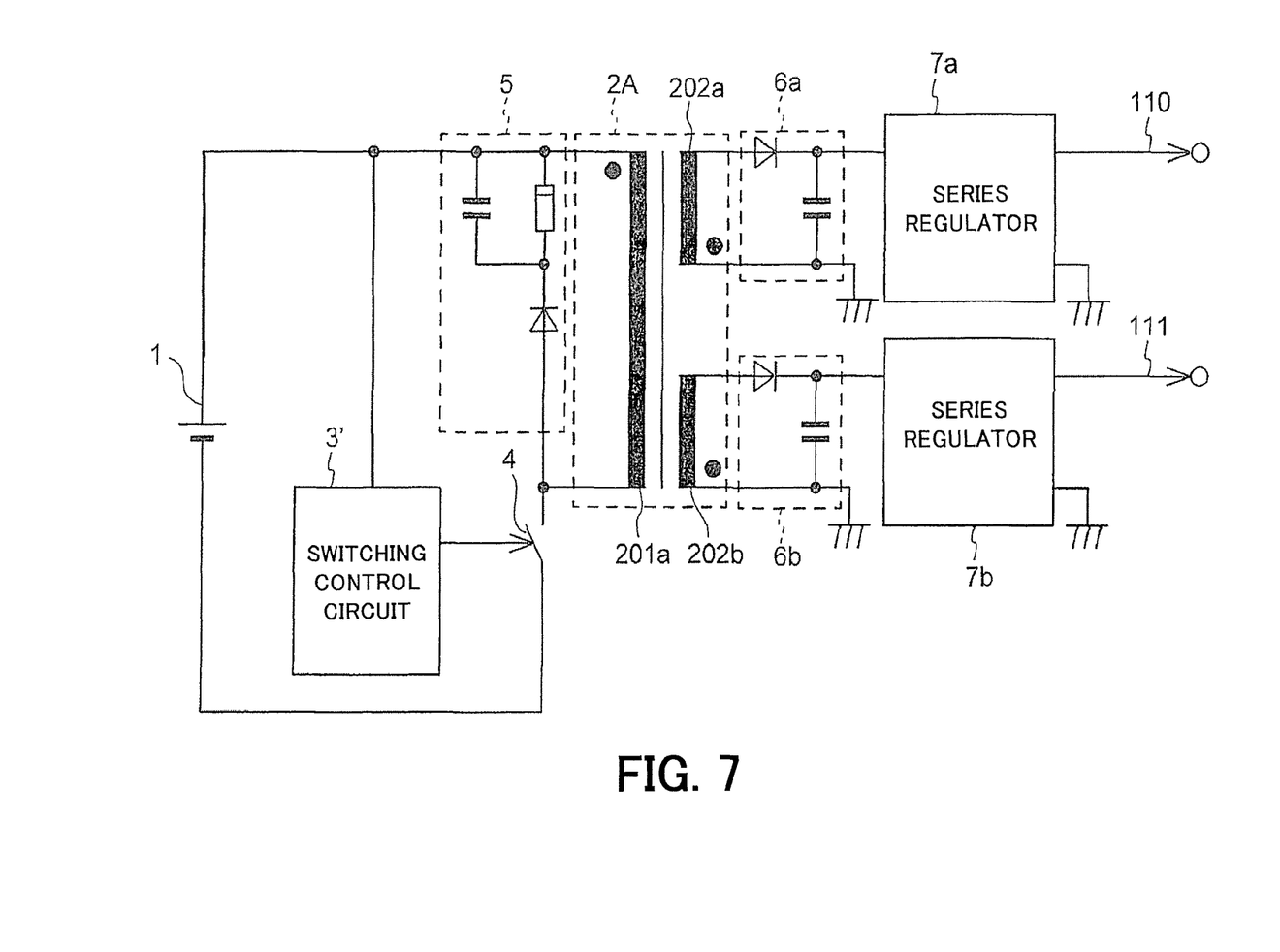
FIG. 7 is a schematic circuit diagram for illustrating a basic configuration of an insulated power supply circuit of a comparative example in a case in which an output condition change command signal is not used in the configuration of FIG. 1.

FIG. 1 is a schematic circuit diagram for illustrating a basic configuration of an insulated power supply circuit according to a first embodiment of the present invention. FIG. 7 is a schematic circuit diagram for illustrating a basic configuration of an insulated power supply circuit as a comparative example in a case in which a command signal 101 to change an output condition is not used in the configuration of FIG. 1. The insulated power supply circuit according to the first embodiment has such a form that the command signal 101 to change an output condition is input to a switching control circuit 3 of a power input circuit as described later. In contrast, the insulated power supply circuit of the comparative example has such a form that the command signal 101 to change an output condition is not input to a switching control circuit 3' of the power input circuit.

With reference to those figures, a basic configuration common to the two insulated power supply circuits is such that one primary-side winding 201a is provided on a primary side of an insulation transformer 2A, and one pair of secondary-side windings 202a and 202b are provided on a secondary side thereof. The primary-side winding 201a is connected to the power input circuit having a switching function. The one pair of secondary-side windings 202a and 202b are connected to different power output circuits.

Among those, the power input circuit includes: the switching control circuit 3 or switching control circuit 3' configured to receive power supplied from a DC power supply 1; a switching element 4 connected to the switching control circuit 3 or switching control circuit 3'; and a snubber circuit 5 serving as a protective circuit with respect to the switching element 4. Any power supply other than the DC power supply may be used for the insulation transformer 2A. For example, AC power including ripple components may be converted into DC power and then applied thereto.

In one output system, a rectifying/smoothing circuit 6a is connected to the secondary-side winding 202a. The one output system includes a series regulator 7a being a constant-voltage power supply circuit forming a power output circuit, which is connected to the rectifying/smoothing circuit 6a, and configured to generate an output A110 being a constant voltage to output the generated voltage to a terminal. In another output system, a rectifying/smoothing circuit 6b is connected to the secondary-side winding 202b. The another output system includes a series regulator 7b being a constant-voltage power supply circuit forming a power output circuit, which is connected to the rectifying/smoothing circuit 6b, and configured to generate an output B111 being a constant voltage to output the generated voltage to a terminal.

In the above-mentioned insulated power supply circuit, the secondary-side winding 202a is connected to the ground via the rectifying/smoothing circuit 6a. The series regulator 7a is also connected to the ground. Further, the secondary-side winding 202b is connected to the ground via the rectifying/smoothing circuit 6b. The series regulator 7b is also connected to the ground. A positive side of the DC power supply 1 is connected to one end of the switching control circuit 3 or switching control circuit 3' of the power input circuit and to one end of the secondary-side winding 201a of the insulation transformer 2A via the snubber circuit 5. A negative side of the DC power supply 1 is connected to the switching element 4 of the power input circuit. The above-mentioned circuit configuration is common to FIG. 1 and FIG. 7.

The insulated power supply circuit according to the first embodiment as illustrated in FIG. 1 has the following configuration. That is, in order to change output voltages of the secondary-side windings 202a and 202b of the insulation transformer 2A, the externally generated command signal 101 to change an output condition is input to the switching control circuit 3 in the insulated power supply circuit via a terminal. Other configuration is the same as the circuit configuration of FIG. 7.

Those insulated power supply circuits have such a basic function that, in response to ON/OFF control on the switching element 4 by the switching control circuit 3 or switching control circuit 3', the primary-side winding 201a of the insulation transformer 2A is excited, to thereby generate output voltages in the secondary-side windings 202a and 202b. The output voltages from the secondary-side windings 202a and 202b are rectified and smoothed through the rectifying/smoothing circuits 6a and 6b, and then applied to the series regulators 7a and 7b, respectively. With this, the series regulators 7a and 7b respectively generate the outputs A110 and B111 that have been adjusted into constant voltages to apply the generated outputs to their output terminals.

In the above-mentioned insulated power supply circuits, when load currents increase in the output A110 and the output B111, output voltages generated in the secondary-side windings 202a and 202b of the insulation transformer 2A are decreased. Further, when the load currents of the output A110 and the output B111 are not equal, the output voltages generated in the secondary-side windings 202a and 202b of the insulation transformer 2A are also not equal.

In general, the series regulators 7a and 7b are used to step down a voltage. The input voltage of each of the series regulators 7a and 7b is required to be equal to or more than a voltage obtained by adding, to the output voltage of each of the series regulators 7a and 7b, a minimum operable potential difference of each of the series regulators 7a and 7b. Thus, the output voltages generated in the secondary-side windings 202a and 202b are conditional ones. That is, it is required to generate, as an output voltage, a voltage equal to or more than a voltage obtained by adding the minimum operable potential difference of each of the series regulators 7a and 7b to an output voltage of each of the series regulators 7a and 7b generated with respect to the maximum load current in a load connected to each of the series regulators 7a and 7b.

To be specific, when loads connected to the output A110 and the output B111 are different in magnitude, and thus differ in load current, it is required to perform adjustment to an output voltage of any one of the secondary-side windings 202a and 202b on a larger load current side. A series regulator connected to a smaller load current side is increased in potential difference between an optimum input voltage and an actually-input input voltage. Thus, loss and heat generation are increased in this series regulator. The optimum input voltage used herein is a voltage obtained by adding the minimum operable potential difference to the output voltage of each of the series regulators 7a and 7b.

Further, in order to increase an output voltage to be generated in each of the secondary-side windings 202a and 202b, a duty ratio is changed through control by the switching control circuit 3 or switching control circuit 3'. When the duty ratio is extremely increased or decreased, loss of the power input circuit provided on the primary side in the insulated power supply circuit is increased. In such cases, needless to say, loss of the switching control circuit 3 or switching control circuit 3' itself is also increased. As described above, output voltages required from the secondary-side windings 202a and 202b vary depending on load currents of the output A110 and the output B111.

The insulated power supply circuit of the comparative example as illustrated in FIG. 7 has a function of changing output voltages of the secondary-side windings 202a and 202b in accordance with the condition of the duty ratio which is set through the control by the switching control circuit 3'. Therefore, when the output A110 and the output B111 differ in load current magnitude, it is difficult to reduce a potential difference between the output voltage of the secondary-side winding 202a and the optimum input voltage of the series regulator 7a, and a potential difference between the output voltage of the secondary-side winding 202b and the optimum input voltage of the series regulator 7b.

In contrast, in the insulated power supply circuit according to the first embodiment, the command signal 101 to change an output condition, which is externally generated in accordance with load conditions of the output A110 and the output B111 and used to change the output condition of the switching control circuit 3, is input to the switching control circuit 3 via an input terminal. The load condition may be, for example, a magnitude of a load current. With this, the switching control circuit 3 can perform control to change the excitation level of the primary-side winding 201a not only in accordance with the condition of the duty ratio but also in response to reception of the command to change the output condition of the switching control circuit 3.

That is, the switching control circuit 3 has a voltage generation function of generating a voltage corresponding to an estimated value of a preset excitation level through the ON/OFF control on the switching element 4 under a state in which the output condition is changeable. The voltage thus generated with the use of the voltage generation function is used to change the excitation level of the primary-side winding 201a of the insulation transformer 2A. The ON/OFF control on the switching element 4 includes a switching function of changing an ON/OFF period or frequency. The configuration of the switching control circuit 3 may include or may not include a feedback circuit.

As a result of the above-mentioned operation, the secondary-side windings 202a and 202b each generate an output voltage corresponding to the output condition in response to a change in excitation level of the primary-side winding 201a. By thus changing the output voltages of the secondary-side windings 202a and 202b, it is possible to reduce a potential difference between the output voltage of the secondary-side winding 202a and an optimum input voltage of the series regulator 7a and a potential difference between the output voltage of the secondary-side winding 202b and an optimum input voltage of the series regulator 7b. As a result, loss and heat generation in the series regulators 7a and 7b can be suppressed. Further, in the insulated power supply circuit according to the first embodiment, it is not required to extremely increase or decrease the duty ratio in the switching control circuit 3, and hence loss of the switching control circuit 3 is suppressed.

By the way, in the insulated power supply circuit according to the first embodiment, the power input circuit provided on the primary side of the insulation transformer 2A, that is, the switching control circuit 3 and the switching element 4 may have any style of configuration in its details as long as the primary-side winding 201a can be excited. For example, a waveform may be generated through use of an oscillation circuit, a D/A converter, a comparator, an I/O port of a microcomputer, or other devices. Further, the switching element 4 may be incorporated in the switching control circuit 3.

Regarding the basic configuration of the insulated power supply circuit of FIG. 1, for example, the numbers of secondary-side windings 202a and 202b, rectifying/smoothing circuits 6a and 6b, and series regulators 7a and 7b are given by way of example, and are only required to be more than one. That is, the insulation transformer 2A can be modified appropriately as long as a circuit configuration ensures insulation with the use of a device having the same function as that of a generally used transformer. For example, the topology represented by flyback, forward, and push-pull is not limited.

Further, the series regulators 7a and 7b provided, as the constant-voltage power supply circuits, on the secondary side of the insulation transformer 2A are given by way of example, and may be circuits of any style as long as voltage conversion is possible. For example, a switching regulator or a shunt regulator can be used instead. Also the configuration of the series regulators 7a and 7b may or may not include a feedback circuit.

In addition, the command signal 101 to change an output condition, which is to be input to the switching control circuit 3, is not always required to be a single logic signal. For example, a serial signal, a parallel signal, an analog signal, or other signals can be used instead. When the switching control circuit 3 is configured by a logic circuit or a program implemented by, for example, a microcomputer or a field-programmable gate array (FPGA), the command signal 101 to change an output condition may be provided on the program instead of being provided in the circuit. However, the command signal 101 to change an output condition for use in the insulated power supply circuit of the first embodiment is externally generated in accordance with the magnitude of each load connected to the secondary side of the insulation transformer 2A, and then input to the switching control circuit 3 via the input terminal as illustrated in FIG. 1.

Second Embodiment

Figure 2:
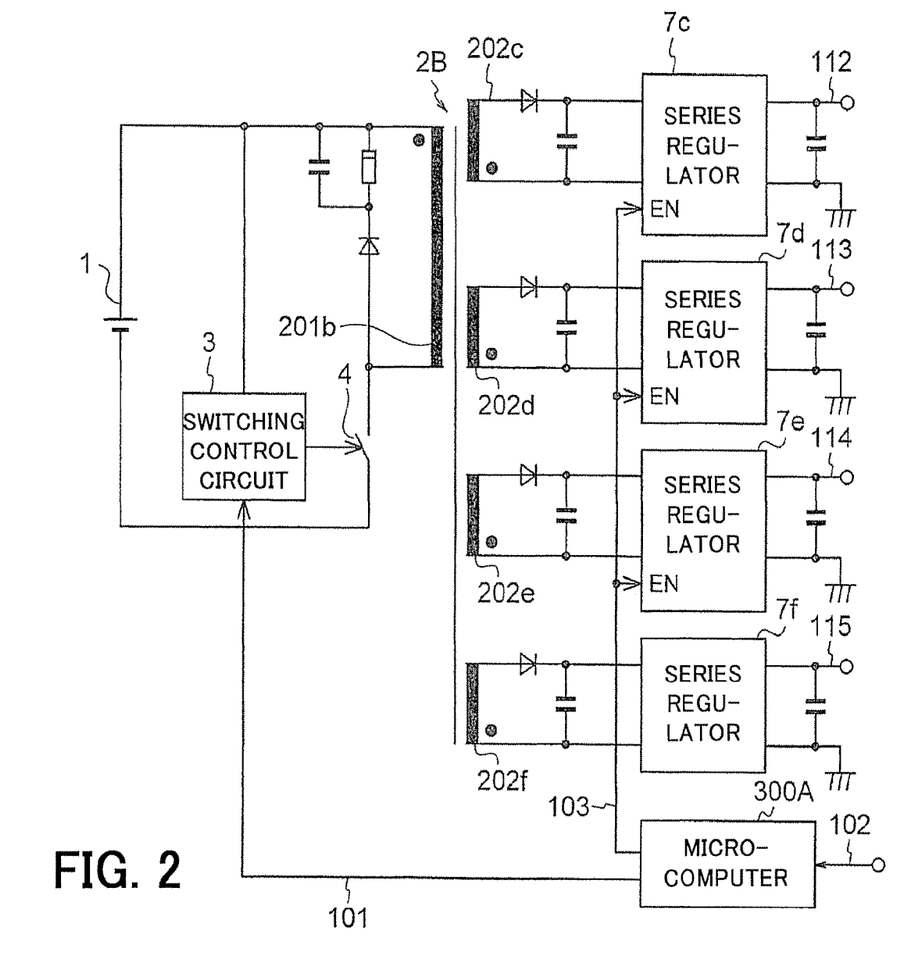
FIG. 2 is a schematic circuit diagram for illustrating a basic configuration of an insulated power supply circuit according to a second embodiment of the present invention.

FIG. 2 is a schematic circuit diagram for illustrating a basic configuration of an insulated power supply circuit according to a second embodiment of the present invention.

The insulated power supply circuit of the second embodiment has a configuration in which power outputs of four systems are achieved on a secondary side of an insulation transformer 2B with the use of a microcomputer 300A serving as an operation switching control circuit having an operation switching control function for power output circuits.

With reference to FIG. 2, the insulated power supply circuit of the second embodiment includes one primary-side winding 201b provided on a primary side of the insulation transformer 2B, and four secondary-side windings 202c, 202d, 202e, and 202f in total provided on the secondary side thereof. A power input circuit for the primary-side winding 201b on the primary side of the insulation transformer 2B has the same configuration as that in the first embodiment. The secondary-side windings 202c, 202d, 202e, and 202f on the secondary side of the insulation transformer 2B are respectively connected to series regulators 7c, 7d, 7e, and 7f being constant-voltage power supply circuits forming the power output circuits via rectifying/smoothing circuits.

In the insulated power supply circuit of the second embodiment, the secondary-side winding 202c is connected to the ground via a corresponding rectifying/smoothing circuit and the series regulator 7c. Similarly, the secondary-side winding 202d is also connected to the ground via a corresponding rectifying/smoothing circuit and the series regulator 7d. Similarly, the secondary-side winding 202e is also connected to the ground via a corresponding rectifying/smoothing circuit and the series regulator 7e. Similarly, the secondary-side winding 202f is also connected to the ground via a corresponding rectifying/smoothing circuit and the series regulator 7f.

In the insulated power supply circuit of the second embodiment, the switching control circuit 3 of the power input circuit provided on the primary side receives the command signal 101 to change an output condition, which is generated in the microcomputer 300A that receives power supply and also receives an operation command signal 102 such as a sleep command signal from an input terminal. Further, an operation switching signal 103 is generated through the microcomputer 300A that has received the operation command signal 102, and is input to each of the series regulators 7c, 7d, and 7e of the power output circuits on the secondary side. The operation switching signal 103 input to each of the series regulators 7c, 7d, and 7e is used to turn on or off an enable EN for their operations.

Further, in the insulated power supply circuit of the second embodiment, an output terminal of the series regulator 7c is used for an external I/F power supply 112, and an output terminal of the series regulator 7d is used for an analog power supply 113. The I/F represents an interface. Further, an output terminal of the series regulator 7e is used for a microcomputer power supply 114, and an output terminal of the series regulator 7f is used for a standby power supply 115.

In general, when a standby function is to be achieved by the microcomputer 300A, the external I/F power supply 112 for an external I/F circuit of the microcomputer 300A and the analog power supply 113 for an analog circuit are turned off or brought into a low-load state. In this way, power is continuously supplied to a peripheral circuit of the microcomputer 300A.

In order to achieve the standby state by the microcomputer 300A, a load current is reduced. Thus, in the insulated power supply circuit according to the second embodiment, the microcomputer 300A outputs the command signal 101 to change an output condition, to thereby set the output condition of the switching control circuit 3. The output condition is set such that the voltage of the secondary-side winding 202f of the insulation transformer 2B exceeds the minimum operable potential difference in the series regulator 7f, which is required to obtain the standby power supply 115 required for the microcomputer 300A.

When the microcomputer 300A releases the standby state to turn on the peripheral circuit, it is required to compensate for a current to be consumed in the peripheral circuit. The output voltages of the secondary-side windings 202c, 202d, and 202e of the insulation transformer 2B are decreased, and the output voltage of the secondary-side winding 202f is accordingly decreased as well. To address this, the command signal 101 to change an output condition is generated by the microcomputer 300A to change the output condition of the switching control circuit 3 so that a voltage required for sections of the peripheral circuit can be obtained even when a load is applied to each of the secondary-side windings 202c, 202d, 202e, and 202f. The following points are the same as those in the first embodiment: a voltage corresponding to an estimated value of a preset excitation level is generated through the ON/OFF control on the switching element 4 by the switching control circuit 3; and the control includes a switching function of changing the ON/OFF period or frequency. In this example as well, the configuration of the switching control circuit 3 may include or may not include a feedback circuit.

To be specific, when the excitation level of the primary-side winding 201b is changed through the ON/OFF control on the switching element 4, output voltages are accordingly generated in the secondary-side windings 202c, 202d, 202e, and 202f. At this time, for example, when receiving the operation command signal 102 being a sleep command signal, the microcomputer 300A operates under an OFF state of the signal, and uses the operation switching signal 103 to bring the enable EN of each of the series regulators 7c, 7d, and 7e into an ON state, that is, enabled state. Then, the respective output-to-input potential differences between secondary-side windings 202c, 202d, and 202e and the series regulators 7c, 7d, and 7e, and the output-to-input potential difference between the secondary-side winding 202f and the series regulator 7f, which are determined based on the operation condition, are reduced. Consequently, the above-mentioned object is achieved, and the insulated power supply circuit that ensures high efficiency and low heat generation is obtained as in the first embodiment. When receiving the operation command signal 102 being the sleep command signal, the microcomputer 300A is shifted to an OFF state under an ON state of the signal. Then, the operation switching signal 103 is brought into an OFF state to disable the enable EN of each of the series regulators 7c, 7d, and 7e. That is, in this case, the command signal 101 to change an output condition is generated in accordance with ON/OFF of the microcomputer 300A itself that has the operation switching control function for the power output circuits, or in accordance with logic operation by the microcomputer 300A.

Incidentally, each of the series regulators 7c, 7d, 7e, and 7f used as the constant-voltage power supply circuits of the power output circuits in the second embodiment as illustrated in FIG. 2 has a function of generating and applying a constant voltage specific to its corresponding output terminal. However, this configuration is given by way of example, and the present invention is not limited thereto. For example, a switching regulator, a shunt regulator, or other regulators may be used instead, and a circuit of any style can be employed as long as the circuit has a voltage conversion function.

Third Embodiment

Figure 3:
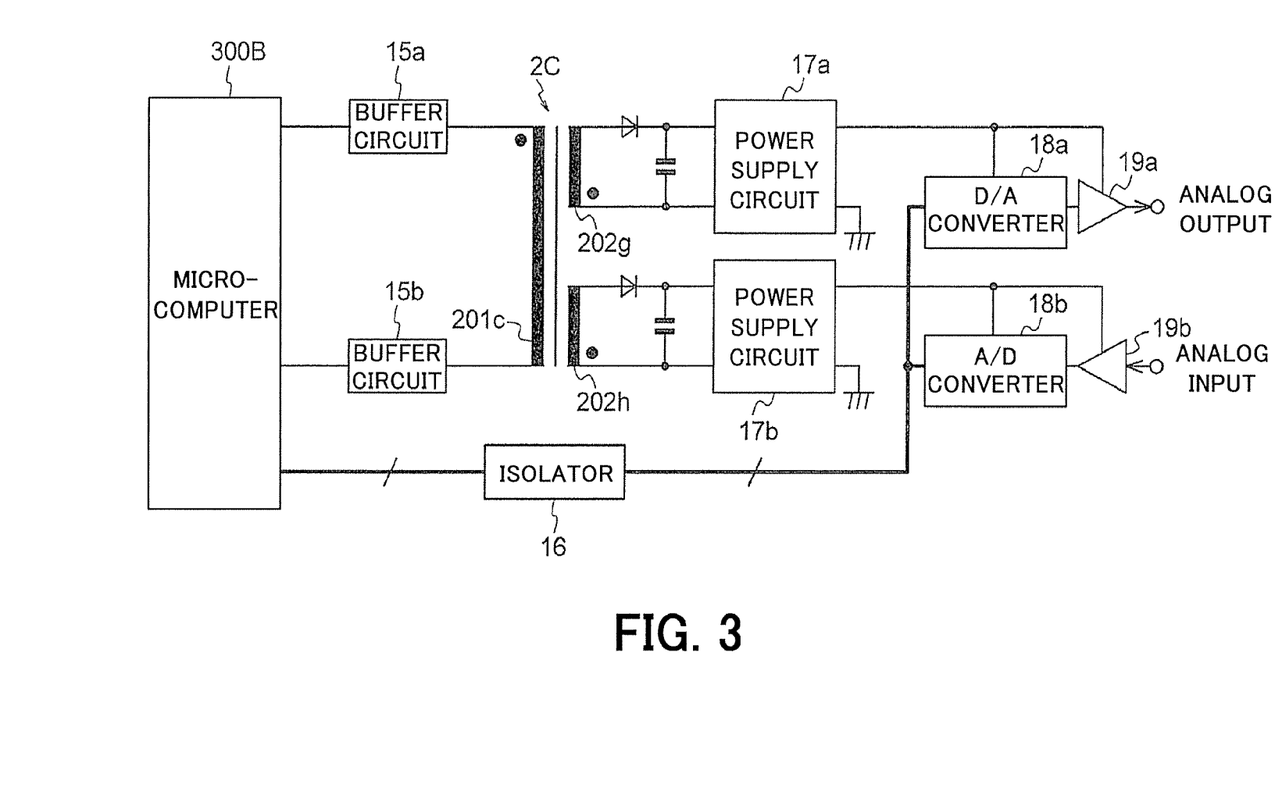
FIG. 3 is a schematic circuit diagram for illustrating a basic configuration of an insulated power supply circuit according to a third embodiment of the present invention.

FIG. 3 is a schematic circuit diagram for illustrating a basic configuration of an insulated power supply circuit according to a third embodiment of the present invention. The insulated power supply circuit of the third embodiment employs a microcomputer 300B being an arithmetic logic unit that receives power supply. With the microcomputer 300B, the switching function and the voltage generation function of the power input circuit in the first embodiment are pre-established through logic operation. Here, an application example in which one-system analog input is made to obtain one-system analog output is illustrated as its usage mode.

With reference to FIG. 3, the insulated power supply circuit of the third embodiment includes one primary-side winding 201c provided on a primary side of an insulation transformer 2C, and one pair of secondary-side windings 202g and 202h provided on a secondary side thereof. The primary-side winding 201c is connected to the microcomputer 300B via buffer circuits 15a and 15b. Further, the one pair of secondary-side windings 202g and 202h are connected via rectifying/smoothing circuits to power supply circuits 17a and 17b being constant-voltage power supply circuits forming the power output circuit.

Further, the power supply circuit 17a is connected to a D/A converter 18a and a differential circuit 19a. The differential circuit 19a has an input side connected to the D/A converter 18a and an output terminal used for the analog output. In addition, the power supply circuit 17b is connected to an A/D converter 18b and a differential circuit 19b. The differential circuit 19b has an output side connected to the A/D converter 18b and an input terminal used for the analog input. Other than the foregoing, an isolator 16 is interposed between the microcomputer 300B and each of the D/A converter 18a and the A/D converter 18b. The isolator 16 allows communications between the microcomputer 300B and each of the D/A converter 18a and the A/D converter 18b.

In the insulated power supply circuit of the third embodiment, the configuration including the microcomputer 300B and the buffer circuits 15a and 15b forms the power input circuit. Further, the power supply circuit 17a serves as the power output circuit. Further, the configuration including the differential circuits 19a and 19b, the D/A converter 18a, the A/D converter 18b, and the isolator 16 forms a communication system circuit to be connected with the microcomputer 300B. The secondary-side winding 202g is connected to the ground via a rectifying/smoothing circuit and the power supply circuit 17a. The secondary-side winding 202h is connected to the ground via a rectifying/smoothing circuit and the power supply circuit 17b.

In the insulated power supply circuit of the third embodiment, the following voltage is employed: an application voltage to be obtained by the A/D converter 18b performing A/D conversion on the analog input that is applied from the outside via the differential circuit 19b; or an output voltage of the D/A converter 18a that is set in the microcomputer 300B. The microcomputer 300B evaluates a load condition based on the application voltage of the A/D converter 18b or the output voltage of the D/A converter 18a. Then, the microcomputer 300B excites the primary-side winding 202c of the insulation transformer 2C via the buffer circuits 15a and 15b in accordance with the load condition. A signal generated by the microcomputer 300B and used to excite the primary-side winding 202c of the insulation transformer 2C via the buffer circuits 15a and 15b, has a switching function to be ON/OFF-controlled based on an internally generated command signal 101 to change an output condition. The signal also has a voltage generation function of generating a voltage corresponding to an estimated value of a preset excitation level, which is obtained with the use of the switching function.

The microcomputer 300B may evaluate an output voltage, an output current, and a load resistance irrespective of the conditions set in the program, and add those to the conditions or switch the conditions. To give one example, under a case in which voltage output is used as the load condition, an output current generally becomes larger as a load resistance becomes smaller. For example, under a case in which current output is used as the load condition, required current can be estimated from an output current value set by the microcomputer 300B. Thus, for example, the output voltage, the output current, and the load resistance may be evaluated by the A/D converter 18b, a comparator, or other devices so that the command signal 101 to change an output condition is generated in the microcomputer 300B by the program of the microcomputer 300B in accordance with the evaluation result.

The microcomputer 300B outputs to the buffer circuits 15a and 15b an excitation signal for a voltage corresponding to the estimated value of the excitation level, which is obtained with the use of the switching function that is ON/OFF-controlled based on the internally generated command signal 101 to change an output condition, and the voltage generation function that is exerted in accordance with the ON/OFF control on the switching function. Then, the buffer circuits 15a and 15b each apply a desired excitation signal to the primary-side winding 202c of the insulation transformer 2C. When the primary-side winding 202c of the insulation transformer 2C is excited in response to the excitation signal, the excitation level is changed. Along with the change in excitation level, output voltages are generated in the secondary-side windings 202g and 202h of the insulation transformer 2C. The output voltage of the secondary-side winding 202g is rectified and smoothed by the rectifying/smoothing circuit and then applied to the power supply circuit 17a. Further, the output voltage of the secondary-side winding 202h is rectified and smoothed by the rectifying/smoothing circuit and then applied to the power supply circuit 17b. The power supply circuit 17a generates a constant voltage, and applies the generated constant voltage to the D/A converter 18a and the differential circuit 19a. The power supply circuit 17b generates a constant voltage, and applies the generated constant voltage to the A/D converter 18b and the differential circuit 19b.

In the insulated power supply circuit of the third embodiment, the analog input received from the terminal of the differential circuit 19b is A/D-converted by the A/D converter 18b into a digital signal. The digital signal is sent to the isolator 16 and the D/A converter 18a. The D/A converter 18a performs D/A conversion on the digital signal to generate an analog signal, and outputs the analog signal as analog output via the terminal of the differential circuit 19a. The isolator 16 sends the digital signal to the microcomputer 300B for communication. Upon the above-mentioned operations for the analog input and the analog output, the signals have almost no potential difference because the microcomputer 300B changes the excitation level of the primary-side winding 202c to control the potential difference between the output voltage of the secondary-side winding 202g and the input voltage of the power supply circuit 17a, and the potential difference between the output voltage of the secondary-side winding 202h and the input voltage of the power supply circuit 17b. As a result, the above-mentioned object is achieved, and the insulated power supply circuit that ensures high efficiency and low heat generation is obtained as in the first embodiment.

Incidentally, the A/D converter 18b in the insulated power supply circuit of the third embodiment may be connected to a DC/DC converter so that the microcomputer 300B changes an output condition of the DC/DC converter.

Fourth Embodiment

Figure 4:
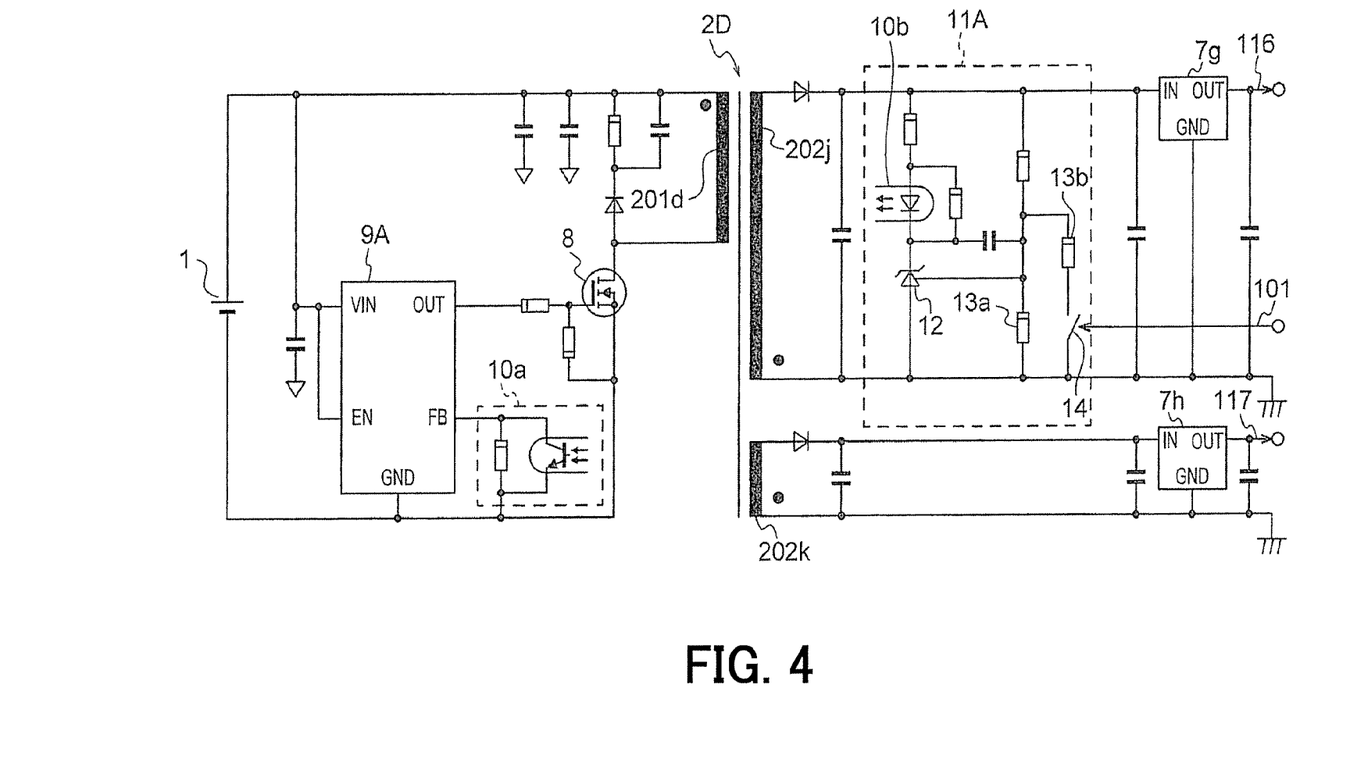
FIG. 4 is a schematic circuit diagram for illustrating a basic configuration of an insulated power supply circuit according to a fourth embodiment of the present invention.

FIG. 4 is a schematic circuit diagram for illustrating a basic configuration of an insulated power supply circuit according to a fourth embodiment of the present invention. The insulated power supply circuit of the fourth embodiment has a configuration in which a feedback circuit 11A is provided at a previous stage of a power output circuit provided on a secondary side of an insulation transformer 2D.

With reference to FIG. 4, the insulated power supply circuit of the fourth embodiment includes one primary-side winding 201d provided on a primary side of the insulation transformer 2D, and one pair of secondary-side windings 202j and 202k on the secondary side thereof. A power input circuit provided on the primary side of the insulation transformer 2D includes a snubber circuit connected to the primary-side winding 201d similarly to the first embodiment, and also includes a switching regulator 9A. Further, a MOS-FET 8 is employed in the power input circuit to serve as an opening/closing element to be connected to the snubber circuit and the switching regulator 9A. The power input circuit further includes a light-receiving photo coupler 10a configured to supply a feedback signal to the switching regulator 9A after photoelectric conversion.

On the secondary side of the insulation transformer 2D, one secondary-side winding 202j is connected to the feedback circuit 11A via a rectifying/smoothing circuit. The feedback circuit 11A includes an electronic switch 14, feedback resistors 13a and 13b, a shunt regulator 12, and a light-emitting photo coupler 10b. The feedback circuit 11A is connected to a series regulator 7g being a constant-voltage power supply circuit forming a power output circuit, which is configured to generate an output C116 being a constant voltage to apply the generated voltage to an output terminal. Another secondary-side winding 202k is connected via a rectifying/smoothing circuit to a series regulator 7h being a constant-voltage power supply circuit forming a power output circuit. The series regulator 7h is configured to generate an output D117 being a constant voltage to apply the generated voltage to an output terminal.

In the insulated power supply circuit of the fourth embodiment, the secondary-side winding 202j is connected to the ground via the rectifying/smoothing circuit, the feedback circuit 11A, and the series regulator 7g. Further, the secondary-side winding 202k is connected to the ground via the rectifying/smoothing circuit and the series regulator 7h. The photo couplers 10a and 10b perform feedback between the primary side and the secondary side of the insulation transformer 2D as follows: the light-receiving photo coupler 10a on the primary side receives irradiation light from the light-emitting photo coupler 10b on the secondary side, and then performs photoelectric conversion of the irradiation light.

In the feedback circuit 11A, when the command signal 101 to change an output condition, which is used to switch the feedback resistors 13a and 13b, is input to the electronic switch 14 from the outside via an input terminal, the electronic switch 14 is switched on or off. In response to this operation, the shunt regulator 12 generates a reference voltage being a constant voltage so as to switch resistance values, reference voltage values, or other values of the feedback resistors 13a and 13b in the feedback circuit 11A for use as a comparison value or a reference value.

For example, the following case is considered. That is, the output C116 to the output terminal of the series regulator 7g connected to the feedback circuit 11A, is connected to a low load, and a load current is increased in the output D117 to the output terminal of the series regulator 7h not connected to the feedback circuit 11A. In this case, the output voltage of the secondary-side winding 202j associated with the feedback circuit 11A is kept constant. However, the output voltage of the secondary-side winding 202k not associated with the feedback circuit 11A is decreased.

In the insulated power supply circuit of the fourth embodiment, the feedback resistor 13b and the electronic switch 14 are arranged in parallel with the feedback resistor 13a for the shunt regulator 12 in the feedback circuit 11A provided at a previous stage of the power output circuit. In addition, the electronic switch 14 is switched on or off in accordance with the command signal 101 to change an output condition, which is input from an input terminal and used to switch the feedback resistors 13a and 13b. With this configuration, a voltage to be applied to the shunt regulator 12 is switched as comparison input of the feedback circuit 11A between two levels: a voltage from the feedback resistor 13a and a voltage divided by the feedback resistors 13a and 13b. In accordance with the applied voltage, the photo coupler 10b radiates irradiation light, and the light-receiving photo coupler 10a on the primary side receives the irradiation light to perform photoelectric conversion of the irradiation light. As a result, the output condition of the switching regulator 9A on the primary side of the insulation transformer 2D is indirectly changed.

Through the ON/OFF control on the MOS-FET 8 under this state, a voltage corresponding to an estimated value of a preset excitation level is generated, to thereby change the excitation level of the primary-side winding 201d. Along with the change in excitation level, output voltages are generated in the secondary-side windings 202j and 202k on the secondary side of the insulation transformer 2D. Consequently, the above-mentioned object is achieved, and the insulated power supply circuit that ensures high efficiency and low heat generation is obtained as in the first embodiment.

Incidentally, the number of switches and the circuit configuration of the feedback circuit 11A in the insulated power supply circuit of the fourth embodiment are given by way of example, and the present invention is not limited to the disclosed ones. Every circuit can be used as long as the circuit monitors a voltage or current on the secondary side of the insulation transformer 2D, and compares the monitored voltage or current with a reference voltage or a reference current to perform feedback. Such circuits may have any form as long as a value of the feedback voltage can be varied based on the command signal 101 to change an output condition, and one or more of any of the output voltages of the switching regulator 9A on the primary side of the insulation transformer 2D, and the secondary-side windings 202j and 202k can be indirectly changed. The command signal 101 to change an output condition used in the insulated power supply circuit of the fourth embodiment is externally generated based on a voltage or current on the secondary side of the insulation transformer 2D, and then input from the input terminal to the electronic switch 14 of the feedback circuit 11A. This command signal 101 to change an output condition contributes to generation of the irradiation light from the photo coupler 10b.

Fifth Embodiment

Figure 5:
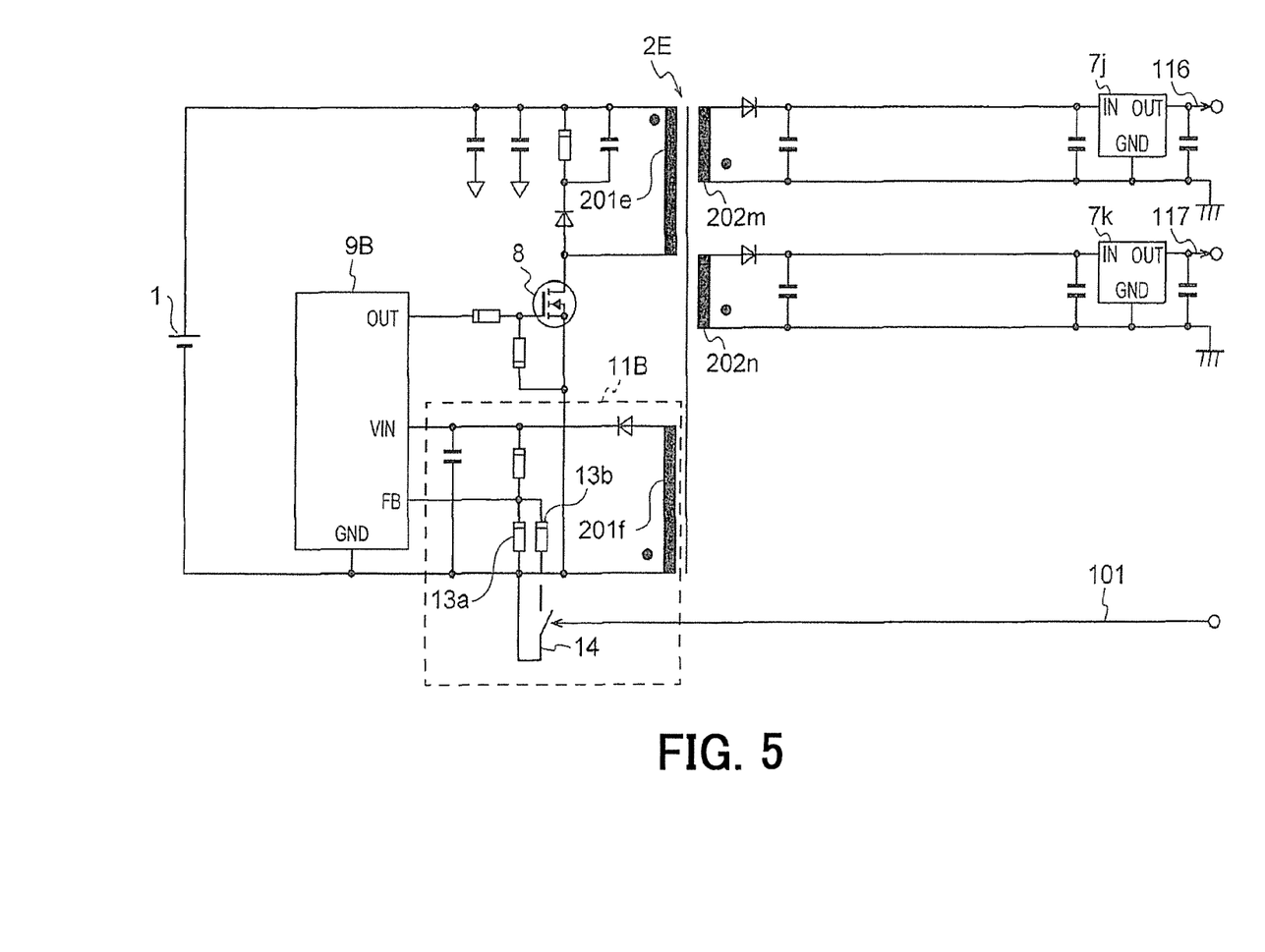
FIG. 5 is a schematic circuit diagram for illustrating a basic configuration of an insulated power supply circuit according to a fifth embodiment of the present invention.

FIG. 5 is a schematic circuit diagram for illustrating a basic configuration of an insulated power supply circuit according to a fifth embodiment of the present invention. The insulated power supply circuit of the fifth embodiment has a configuration in which a feedback auxiliary winding 201f is provided on a primary side of an insulation transformer 2E, and a feedback circuit 11B configured to perform feedback from the feedback auxiliary winding 201f is included in a power input circuit.

With reference to FIG. 5, the insulated power supply circuit of the fifth embodiment includes one primary-side winding 201e and the feedback auxiliary winding 201f, which are provided on the primary side of the insulation transformer 2E, and one pair of secondary-side windings 202m and 202n provided on a secondary side thereof. The power input circuit provided on the primary side of the insulation transformer 2E includes a snubber circuit connected to the primary-side winding 201e similarly to the first embodiment, and also includes a switching regulator 9B. Further, the MOS-FET 8 is employed in the power input circuit to serve as an opening/closing element to be connected to the snubber circuit and the switching regulator 9B. The power input circuit further includes the feedback circuit 11B connected to the feedback auxiliary winding 201f.

On the secondary side of the insulation transformer 2E, one secondary-side winding 202m is connected via a rectifying/smoothing circuit to a series regulator 7j being a constant-voltage power supply circuit forming a power output circuit. The series regulator 7j is configured to generate the output C116 being a constant voltage to apply the generated voltage to an output terminal. Another secondary-side winding 202n is connected via a rectifying/smoothing circuit to a series regulator 7k being a constant-voltage power supply circuit forming a power output circuit. The series regulator 7k is configured to generate an output D117 being a constant voltage to apply the generated voltage to an output terminal.

In the insulated power supply circuit of the fifth embodiment, the secondary-side winding 202m is connected to the ground via the rectifying/smoothing circuit and the series regulator 7j. Further, the secondary-side winding 202n is also connected to the ground via the rectifying/smoothing circuit and the series regulator 7k.

The feedback circuit 11B provided in the power input circuit provided on the primary side includes the feedback auxiliary winding 201f, the electronic switch 14, and the feedback resistors 13a and 13b. The feedback auxiliary winding 201f provides a comparison signal for comparison in feedback. The feedback circuit 11B has the following configuration. That is, the feedback resistor 13b and the electronic switch 14 are arranged in parallel with the feedback resistor 13a. In addition, the electronic switch 14 is switched on or off in accordance with the command signal 101 to change an output condition, which is input from an input terminal and used to switch the feedback resistors 13a and 13b. With this configuration, a feedback voltage of the feedback circuit 11B is switched between two levels: a voltage from the feedback resistor 13a and a voltage divided by the feedback resistors 13a and 13b. Those voltages are applied as comparison input of the switching regulator 9B. With this, the output condition of the switching regulator 9B on the primary side of the insulation transformer 2E is indirectly changed.

Through the ON/OFF control on the MOS-FET 8 under this state, a voltage corresponding to an estimated value of a preset excitation level is generated, to thereby change the excitation level of the primary-side winding 201e. Along with the change in excitation level, output voltages are generated in the secondary-side windings 202m and 202n on the secondary side of the insulation transformer 2E. Consequently, the above-mentioned object is achieved, and the insulated power supply circuit that ensures high efficiency and low heat generation is obtained as in the first embodiment.

Incidentally, the number of switches and the circuit configuration of the feedback circuit 11B in the insulated power supply circuit of the fifth embodiment are given by way of example, and the present invention is not limited to the disclosed ones. Every circuit can be used as long as the circuit monitors a voltage or current on the secondary side of the insulation transformer 2E, and compares the monitored voltage or current with a reference voltage or a reference current to perform feedback. Such circuits may have any form as long as a value of the feedback voltage can be varied based on the command signal 101 to change an output condition, and one or more of any of the output voltages of the switching regulator 9B on the primary side of the insulation transformer 2E, and the secondary-side windings 202m and 202n can be indirectly changed. The command signal 101 to change an output condition used in the insulated power supply circuit of the fifth embodiment is externally generated based on a voltage or current on the primary side of the insulation transformer 2E, and then input from the input terminal to the electronic switch 14 of the feedback circuit 11B. This command signal 101 to change an output condition contributes to generation of a feedback voltage of the feedback circuit 11B.

Further, in the insulated power supply circuit of the fifth embodiment, the comparison signal of the feedback circuit 11B can be obtained and used without providing the feedback auxiliary winding 201f on the primary side of the insulation transformer 2E. For example, it is also possible to monitor a voltage or current of the primary-side winding 202e of the insulation transformer 2E or the MOS-FET 8, and use the monitored voltage or current as a comparison signal of the feedback circuit 11B.

That is, in the insulated power supply circuit of the fifth embodiment, the feedback circuit 11B provided in the power input circuit performs feedback control based on an output voltage of the feedback auxiliary winding 201f. With this, the output voltages of the secondary-side windings 202m and 202n can be stabilized. Further, the feedback circuit 11B can stabilize the output voltage by performing feedback control in accordance with a drive waveform obtained as a result of monitoring a drive waveform on the primary side of the insulation transformer 2E. Further, the feedback circuit 11B can change the output voltage by switchingly changing physical quantity related to the drive condition on the primary side of the insulation transformer 2E in accordance with the command signal 101 to change an output condition. In this example, the physical quantity related to the drive condition on the primary side refers to a voltage, a current, a frequency, a duty ratio, and a deadtime, for example. This suggests that, by switchingly changing those values, the output voltage can be changed.

The present invention is not limited to each embodiment described above, and various kinds of modifications can be made within a range that does not depart from the technical gist of the present invention. All the technical matters included in the technical idea described in the appended claims are included in the scope of the present invention. A preferred example has been given as each embodiment described above. However, a person skilled in the art could arrive at various kinds of modification examples based on the content disclosed herein. For example, in the insulated power supply circuits of the above-mentioned embodiments, the method of generating the command signal 101 to change an output condition is limited, but the method of a certain embodiment can be substituted for and applied to another embodiment by replacing a required component, for example. To give a detailed description thereof, there are the cases in which: the command signal 101 to change an output condition is generated in accordance with the magnitude of a load connected to the secondary side; the command signal 101 is generated in accordance with a voltage or current on the primary side or secondary side; the command signal 101 is generated in accordance with ON/OFF of the operation switching control circuit having the operation switching control function for the power output circuit; and the command signal 101 is generated through logic operation of the arithmetic logic unit.

INDUSTRIAL APPLICABILITY

The insulated power supply circuit of the present invention is applicable to circuits and devices including multiple power supply circuits via the microcomputer, the FPGA, or other devices. For example, the present invention is applicable to industrial apparatus, apparatus for civil use, in-vehicle apparatus, or other apparatus, which are required to ensure low power consumption and low heat generation.

As the examples of the industrial apparatus, the present invention is applicable to D/A output, A/D output, instrumentation, temperature input, and an I/O of relay driving. In an application example, it is possible to reduce loss of an insulated power supply when an unused channel of a multi-output D/A output unit is switched on or off, to thereby achieve high efficiency.

As the examples of the apparatus for civil use, the present invention is preferred for AV equipment having a standby function and white goods such as a rice cooker or a water heater in which a standby function and high load are repeatedly switched, because standby power is reduced.

As the examples of the in-vehicle apparatus, the present invention is preferred for electrical components such as AV equipment or an ECU because power consumption is reduced when a main engine is operating or stopped, or a specific function is turned off.

REFERENCE SIGNS LIST 2A to 2E insulation transformer, 3, 3' switching control circuit, 4 switching element, 7a to 7k series regulator, 8 MOS-FET, 9A, 9B switching regulator, 11A, 11B feedback circuit, 12 shunt regulator, 13a, 13b feedback resistor, 14 electronic switch, 17a, 17b power supply circuit, 201a to 201e primary-side winding, 202a to 202n secondary-side winding, 101 output condition change command signal, 102 operation command signal, 103 operation switching signal, 112 external I/F power supply, 113 analog power supply, 114 microcomputer power supply, 115 standby power supply, 201f feedback auxiliary winding, 300A, 300B microcomputer

The invention claimed is:

1. An insulated power supply circuit, comprising:
an insulation transformer including a primary-side winding provided on a primary side thereof, and a plurality of secondary-side windings provided on a secondary side thereof;
a power input circuit, which is connected to the primary-side winding, and is configured to receive power supply to excite the primary-side winding through ON/OFF of a switching function; and
a plurality of power output circuits, each of which is connected to a corresponding one of the plurality of secondary-side windings, and is configured to, along with excitation of the primary-side winding, receive, as an input voltage, an output voltage generated in the corresponding one of the plurality of secondary-side windings, to thereby generate a constant voltage to be applied to a corresponding load,
wherein the power input circuit has a voltage generation function of generating a voltage of the primary-side winding corresponding to an estimated value of a preset excitation level by controlling the ON/OFF of the switching function based on an output condition change command signal externally input to the insulated power supply circuit, the output condition change command signal being externally generated as a command to change the output voltage in accordance with a load condition of a load to be connected to each of the plurality of power output circuits, and the power input circuit is configured to change an excitation level of the primary-side winding based on the voltage of the primary-side winding obtained with use of the voltage generation function,
wherein each of the plurality of power output circuits is configured to receive, as the input voltage, the output voltage generated in each of the plurality of secondary-side windings in accordance with the voltage of the primary-side winding generated based on the output condition change command signal, to thereby generate the constant voltage to apply the generated constant voltage to the corresponding load, and
the output condition change command signal is generated independently of a feedback circuit configured to stabilize the output voltage in each of the secondary-side windings.

2. The insulated power supply circuit according to claim 1, further comprising the feedback circuit configured to perform feedback control from the secondary side to the primary side of the insulation transformer,
wherein the feedback circuit is configured to stabilize the output voltage.

3. The insulated power supply circuit according to claim 2, wherein the feedback circuit includes a switch element that is switched on or off in response to reception of the output condition change command signal, and the feedback circuit is configured to switchingly change a feedback voltage in accordance with ON/OFF of the switch element, to thereby change the output voltage.

4. The insulated power supply circuit according to claim 3,
wherein the insulation transformer includes a feedback auxiliary winding on the primary side, and wherein the feedback circuit is provided in the power input circuit, and is configured to perform the feedback control based on an output voltage of the feedback auxiliary winding, to thereby stabilize the output voltage.

5. The insulated power supply circuit according to claim 4, wherein the feedback circuit is configured to perform the feedback control in accordance with a drive waveform obtained as a result of monitoring a drive waveform on the primary side of the insulation transformer, to thereby stabilize the output voltage.

6. The insulated power supply circuit according to claim 4, wherein the feedback circuit is configured to switchingly change a physical quantity of a physical element related to a drive condition on the primary side of the insulation transformer in accordance with the output condition change command signal, to thereby change the output voltage.

7. The insulated power supply circuit according to claim 1, wherein the output condition change command signal is generated in accordance with a magnitude of the load to be connected to the secondary side of the insulation transformer.

8. The insulated power supply circuit according to claim 1, wherein the output condition change command signal is generated in accordance with a voltage or a current on the primary side or the secondary side of the insulation transformer.

9. The insulated power supply circuit according to claim 1, wherein the output condition change command signal is generated in accordance with ON/OFF of an operation switching control circuit having an operation switching control function for the plurality of power output circuits.

10. The insulated power supply circuit according to claim 1, wherein the output condition change command signal is generated through logic operations by an arithmetic logic unit.

11. The insulated power supply circuit according to claim 2, wherein the output condition change command signal is generated in accordance with a magnitude of the load to be connected to the secondary side of the insulation transformer.

12. The insulated power supply circuit according to claim 2, wherein the output condition change command signal is generated in accordance with a voltage or a current on the primary side or the secondary side of the insulation transformer.

13. The insulated power supply circuit according to claim 2, wherein the output condition change command signal is generated in accordance with ON/OFF of an operation switching control circuit having an operation switching control function for the plurality of power output circuits.

14. The insulated power supply circuit according to claim 2, wherein the output condition change command signal is generated through logic operations by an arithmetic logic unit.

15. The insulated power supply circuit according to claim 3, wherein the output condition change command signal is generated in accordance with a magnitude of the load to be connected to the secondary side of the insulation transformer.

16. The insulated power supply circuit according to claim 3, wherein the output condition change command signal is generated in accordance with a voltage or a current on the primary side or the secondary side of the insulation transformer.

17. The insulated power supply circuit according to claim 3, wherein the output condition change command signal is generated in accordance with ON/OFF of an operation switching control circuit having an operation switching control function for the plurality of power output circuits.

18. The insulated power supply circuit according to claim 3, wherein the output condition change command signal is generated through logic operations by an arithmetic logic unit.

19. An insulated power supply circuit, comprising:
an insulation transformer including a primary-side winding provided on a primary side thereof, and a plurality of secondary-side windings provided on a secondary side thereof;
a power input circuit, which is connected to the primary-side winding, and is configured to receive power supply to excite the primary-side winding through ON/OFF of a switching function; and
a plurality of power output circuits, each of which is connected to a corresponding one of the plurality of secondary-side windings, and is configured to, along with excitation of the primary-side winding, receive, as an input voltage, an output voltage generated in the corresponding one of the plurality of secondary-side windings, to thereby generate a constant voltage to be applied to a corresponding load,
wherein the power input circuit has a voltage generation function of generating a voltage of the primary-side winding corresponding to an estimated value of a preset excitation level by controlling the ON/OFF of the switching function based on an output condition change command signal, which is generated as a command to change the output voltage in accordance with a load condition of a load to be connected to each of the plurality of power output circuits, and the power input circuit is configured to change an excitation level of the primary-side winding based on the voltage of the primary-side winding obtained with use of the voltage generation function,
wherein each of the plurality of power output circuits is configured to receive, as the input voltage, the output voltage generated in each of the plurality of secondary-side windings in accordance with the voltage of the primary-side winding generated based on the output condition change command signal, to thereby generate the constant voltage to apply the generated constant voltage to the corresponding load
wherein the insulated power supply circuit further comprises a feedback circuit configured to perform feedback control from the secondary side to the primary side of the insulation transformer,
the feedback circuit includes a switch element that is switched on or off in response to reception of the output condition change command signal, and the feedback circuit is configured to switchingly change a feedback voltage in accordance with ON/OFF of the switch element,
the insulation transformer includes a feedback auxiliary winding on the primary side, and
the feedback circuit is provided in the power input circuit, and is configured to perform the feedback control based on an output voltage of the feedback auxiliary winding.

* * * * *